United States Patent
Sung et al.

(10) Patent No.: US 12,146,745 B2
(45) Date of Patent: Nov. 19, 2024

(54) METHOD AND APPARATUS FOR GENERATING, MANAGING, AND SHARING MOVING PATH

(71) Applicant: Samsung Electronics Co., Ltd., Gyeonggi-do (KR)

(72) Inventors: Ju-yun Sung, Gyeonggi-do (KR); Hee-jeong Choo, Gyeonggi-do (KR); Keum-koo Lee, Gyeonggi-do (KR); Ji-young Kwahk, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 548 days.

(21) Appl. No.: 16/842,029

(22) Filed: Apr. 7, 2020

(65) Prior Publication Data

US 2020/0232798 A1 Jul. 23, 2020

Related U.S. Application Data

(60) Continuation of application No. 14/692,162, filed on Apr. 21, 2015, now abandoned, which is a division of
(Continued)

(30) Foreign Application Priority Data

Aug. 21, 2009 (KR) ................. 10-2009-0077876
Aug. 3, 2010 (KR) ................. 10-2010-0075049

(51) Int. Cl.
*G01C 21/28* (2006.01)
*G01C 21/00* (2006.01)
(Continued)

(52) U.S. Cl.
CPC ............. *G01C 21/28* (2013.01); *G01C 21/26* (2013.01); *G01C 21/3647* (2013.01);
(Continued)

(58) Field of Classification Search
CPC ........ G01C 21/28; G01C 21/26; G01C 21/32; G01C 21/3647; H04W 4/029; H04W 4/026; H04W 12/06
See application file for complete search history.

(56) References Cited

U.S. PATENT DOCUMENTS

| | | | |
|---|---|---|---|
| 5,541,592 A * | 7/1996 | Shiihara ................. | G01C 21/26 340/988 |
| 6,173,232 B1 * | 1/2001 | Nanba .................... | G01C 21/28 701/431 |

(Continued)

FOREIGN PATENT DOCUMENTS

| | | |
|---|---|---|
| CN | 1804551 | 7/2006 |
| CN | 1837755 | 9/2006 |

(Continued)

OTHER PUBLICATIONS

Japanese Office Action dated Nov. 25, 2014 issued in counterpart application No. 2012-525496.
(Continued)

*Primary Examiner* — Luis A Martinez Borrero
(74) *Attorney, Agent, or Firm* — The Farrell Law Firm P.C.

(57) ABSTRACT

Methods and apparatuses are provided for generating, managing, and sharing information related to moving-paths of a plurality of devices connected to the server. The server includes a communication interface that receives first information related to a moving path of a first device among the plurality of devices and receives second information related to a moving path of a second device among the plurality of devices, with the first device being different from the second device. A controller provides integrated history information based on the first information and the second information to
(Continued)

at least one of the plurality of devices, with the plurality of devices being managed as a single group in the server.

16 Claims, 10 Drawing Sheets

Related U.S. Application Data application No. 12/861,501, filed on Aug. 23, 2010, now abandoned.

(51) Int. Cl.
- *G01C 21/26* (2006.01)
- *G01C 21/36* (2006.01)
- *H04W 4/02* (2018.01)
- *H04W 4/029* (2018.01)
- *H04W 12/06* (2021.01)

(52) U.S. Cl.
CPC ..... *G01C 21/3848* (2020.08); *G01C 21/3896* (2020.08); *H04W 4/026* (2013.01); *H04W 4/029* (2018.02); *H04W 12/06* (2013.01)

(56) References Cited

U.S. PATENT DOCUMENTS

| | | | |
|---|---|---|---|
| 6,202,024 B1 | 3/2001 | Yokoyama et al. | |
| 6,285,317 B1* | 9/2001 | Ong | G01C 21/3635 342/357.57 |
| 6,359,571 B1* | 3/2002 | Endo | G08G 1/096827 340/905 |
| 7,271,742 B2* | 9/2007 | Sheha | G08G 1/096844 340/995.19 |
| 7,383,123 B2* | 6/2008 | Park | G01C 21/36 701/410 |
| 7,613,563 B2 | 11/2009 | Haegebarth et al. | |
| 7,734,073 B2* | 6/2010 | Jung | G01C 21/20 382/284 |
| 7,734,415 B2 | 6/2010 | Oumi et al. | |
| 7,783,421 B2 | 8/2010 | Arai et al. | |
| 7,840,346 B2* | 11/2010 | Huhtala | A63B 24/0062 702/182 |
| 7,913,179 B2* | 3/2011 | Sheha | G01C 21/3664 715/769 |
| 8,219,316 B2* | 7/2012 | Goel | G01C 21/3484 701/422 |
| 8,515,456 B2* | 8/2013 | Yoon | H04W 4/20 455/414.3 |
| 8,562,489 B2* | 10/2013 | Burton | G04G 17/045 482/901 |
| 8,621,374 B2* | 12/2013 | Sheha | G06F 3/0486 715/769 |
| 8,989,778 B2* | 3/2015 | Altman | H04L 67/535 455/457 |
| 9,108,098 B2* | 8/2015 | Galasso | G06Q 30/0265 |
| 9,467,832 B2* | 10/2016 | Haney | H04W 4/023 |
| 9,582,177 B2* | 2/2017 | Sheha | G06F 3/0484 |
| 10,171,598 B2* | 1/2019 | Chen | H04W 12/086 |
| 10,645,179 B2* | 5/2020 | Chen | G06F 3/04817 |
| 2001/0052861 A1* | 12/2001 | Ohmura | G01C 21/26 340/988 |
| 2002/0156739 A1* | 10/2002 | Hirai | G01C 21/26 705/52 |
| 2002/0173907 A1 | 11/2002 | Subramanian et al. | |
| 2003/0158799 A1* | 8/2003 | Kakihara | G06Q 10/0875 705/30 |
| 2004/0054428 A1* | 3/2004 | Sheha | G06F 3/0484 700/56 |
| 2004/0249565 A1* | 12/2004 | Park | G01C 21/36 701/410 |
| 2005/0004749 A1* | 1/2005 | Park | G01C 21/3655 701/412 |
| 2005/0038596 A1 | 2/2005 | Yang | |
| 2005/0110654 A1* | 5/2005 | Kitano | H04W 4/00 340/13.24 |
| 2005/0131637 A1* | 6/2005 | Chu | G01C 21/3647 701/532 |
| 2006/0089792 A1* | 4/2006 | Manber | H04L 67/04 707/E17.11 |
| 2006/0114125 A1* | 6/2006 | Kubota | G01C 21/28 340/988 |
| 2007/0032949 A1 | 2/2007 | Arai et al. | |
| 2007/0093955 A1* | 4/2007 | Hughes | G01C 21/3644 701/421 |
| 2008/0021632 A1* | 1/2008 | Amano | G08G 1/096827 701/117 |
| 2008/0027639 A1 | 1/2008 | Tryon | |
| 2008/0036653 A1 | 2/2008 | Huston | |
| 2008/0036778 A1* | 2/2008 | Sheha | G06F 3/0486 345/502 |
| 2008/0070593 A1* | 3/2008 | Altman | H04W 4/029 455/457 |
| 2008/0109158 A1* | 5/2008 | Huhtala | A63B 24/0062 701/439 |
| 2008/0114539 A1 | 5/2008 | Lim | |
| 2008/0147305 A1* | 6/2008 | Kawamata | B60W 30/146 701/451 |
| 2008/0162041 A1 | 7/2008 | Nakamura | |
| 2009/0005018 A1 | 1/2009 | Forstall et al. | |
| 2009/0076720 A1* | 3/2009 | Jung | G09B 29/106 382/118 |
| 2009/0097414 A1* | 4/2009 | Yoon | G01C 21/3667 370/254 |
| 2009/0098882 A1* | 4/2009 | Yoon | H04W 4/02 455/456.1 |
| 2009/0125235 A1* | 5/2009 | Chen | G01C 21/3848 701/414 |
| 2009/0182498 A1 | 7/2009 | Seymour | |
| 2009/0276154 A1* | 11/2009 | Subramanian | G01C 21/20 701/469 |
| 2010/0017124 A1* | 1/2010 | Zhao | G01C 21/20 382/106 |
| 2010/0062794 A1* | 3/2010 | Han | H04W 64/006 455/457 |
| 2010/0125411 A1* | 5/2010 | Goel | G01C 21/3492 701/533 |
| 2010/0160014 A1* | 6/2010 | Galasso | G16H 20/30 463/6 |
| 2010/0268452 A1* | 10/2010 | Kindo | G01C 21/3658 345/632 |
| 2011/0003665 A1* | 1/2011 | Burton | G06F 13/4282 482/8 |
| 2011/0046878 A1* | 2/2011 | Sung | H04W 12/06 701/467 |
| 2011/0167371 A1* | 7/2011 | Sheha | G08G 1/096844 715/769 |
| 2012/0176411 A1* | 7/2012 | Huston | H04L 67/52 345/633 |
| 2014/0223331 A1* | 8/2014 | Sheha | G06F 3/04817 715/751 |
| 2015/0222588 A1* | 8/2015 | Kim | G06Q 30/0278 709/204 |
| 2015/0230060 A1* | 8/2015 | Sung | H04W 4/026 455/456.6 |
| 2016/0127486 A1* | 5/2016 | Chen | H04W 4/029 709/206 |
| 2017/0147174 A1* | 5/2017 | Olejniczak | H04N 21/4223 |
| 2017/0322045 A1* | 11/2017 | Breedvelt-Schouten | G06V 20/41 |
| 2019/0098098 A1* | 3/2019 | Chen | H04W 12/086 |
| 2021/0192975 A1* | 6/2021 | Spence | G01C 21/365 |

FOREIGN PATENT DOCUMENTS

| | | |
|---|---|---|
| CN | 101340461 | 1/2009 |
| EP | 1 061 666 | 3/2001 |
| EP | 1 081 666 | 3/2001 |
| EP | 1 681 663 | 7/2006 |

(56) References Cited

FOREIGN PATENT DOCUMENTS

| | | |
|---|---|---|
| JP | 11-339162 | 12/1999 |
| JP | 2000-266562 | 9/2000 |
| JP | 2003-317189 | 11/2003 |
| JP | 2005-098880 | 4/2005 |
| JP | 2006-133903 | 5/2006 |
| JP | 2006-266760 | 10/2006 |
| JP | 2007-108017 | 4/2007 |
| JP | 4031283 | 10/2007 |
| JP | 2008-164821 | 7/2008 |
| JP | 2009-041964 | 2/2009 |
| JP | 2006-092665 | 4/2009 |
| JP | 2009-092665 | 4/2009 |
| KR | 1020050032876 | 4/2005 |
| KR | 1020060005915 | 1/2006 |
| KR | 1020060006271 | 1/2006 |
| KR | 1020070093517 | 9/2007 |
| KR | 1020070104817 | 10/2007 |
| KR | 1020080095561 | 10/2008 |
| KR | 1020090030797 | 3/2009 |
| WO | WO 03/056865 | 7/2003 |

OTHER PUBLICATIONS

Einekave et al., "Incremental Clustering of Mobile Objects," 2007 IEEE 23rd International Conference on Data Engineering Workshop, pp. 585-592, Apr. 17-20, 2007.

Korean Office Action dated Apr. 7, 2016 issued in counterpart application No. 10-2010-0075049, 16 pages.
European Search Report dated Apr. 15, 2016 issued in counterpart application No. 10810207.0-1557, 6 pages.
Japanese Office Action dated May 30, 2016 issued in counterpart application No. 2015-144955, 5 pages.
Chinese Office Action dated Feb. 19, 2019 issued in counterpart application No. 201510557940.5, 20 pages.
European Search Report dated Apr. 3, 2019 issued in counterpart application No. 18205035.1-1003, 7 pages.
Chinese Rejection Decision dated Jan. 9, 2019 issued in counterpart application No. 201510557961.7, 24 pages.
Chinese Office Action dated Aug. 6, 2018 issued in counterpart application No. 201510557961.7, 24 pages.
Chinese Office Action dated Jul. 19, 2017 issued in counterpart application No. 201510557961.7, 17 pages.
Japanese Decision to Rejection dated Aug. 7, 2017 issued in counterpart application No. 2015-144955, 6 pages.
Japanese Office Action dated Jan. 15, 2018 issued in counterpart application No. 2015-144955, 6 pages.
Chinese Office Action dated Jan. 29, 2018 issued in counterpart application No. 201510557961.7, 15 pages.
Japanese Office Action dated Dec. 26, 2016 issued in counterpart application No. 2015-144955, 4 pages.
European Search Report dated Mar. 3, 2022 issued in counterpart application No. 18205035.1-1001, 5 pages.

\* cited by examiner

METHOD AND APPARATUS FOR GENERATING, MANAGING, AND SHARING MOVING PATH

PRIORITY

This application is a Continuation Application of U.S. patent application Ser. No. 14/692,162, which was filed in the United States Patent and Trademark Office on Apr. 21, 2015, as a Divisional Application of U.S. patent application Ser. No. 12/861,501, which was filed in the United States Patent and Trademark Office on Aug. 23, 2010, and is now abandoned, and claims priority under 35 U.S.C. § 119(a) to Korean Patent Application No. 10-2010-0075049, filed on Aug. 3, 2010, and Korean Patent Application No. 10-2009-0077876, filed on Aug. 21, 2009, in the Korean Intellectual Property Office, the content of each of which is incorporated herein by reference.

BACKGROUND OF THE INVENTION

1. Field of the Invention

The present invention relates to sharing and management of a moving path in a mobile communication device.

2. Description of the Related Art

Navigation systems display a moving path considering a current position. Since human actions are likely to be repeated, it is not necessary to find a new path each time a path finding function of the navigation systems is executed.

An automatic path finding service using a navigation system or an Internet service are popular and common. However, a moving path is often determined by a factor, such as human actions or habits, which cannot be expressed or measured by an electric signal.

SUMMARY

The present invention has been made to address at least the above problems and/or disadvantages and to provide at least the advantages described below. Accordingly, an aspect of the present invention provides utilization of moving-path related information by using mobile communication devices, which can obtain position information for sharing the moving path.

According to an aspect of the present invention, a method is provided for displaying information related to a moving path of a mobile communication device, the method including receiving information related to the moving path of the mobile communication device among a plurality of devices; generating history information based on the information; and providing the history information and additional information to at least one other device of the plurality of devices, with the additional information being at least one of image data or video data of a particular point along the moving path.

According to another aspect of the present invention, a method for sharing a moving path of a mobile communication device from among a plurality of devices to at least one other device from among the plurality of devices is provided, the method including obtaining information related to the moving path of the mobile communication device; and providing the information related to the moving path of the mobile communication device to the at least one other device, with the moving path of the mobile communication device being displayed on a map on a screen of the at least one other device, based on the information related to the moving path of the mobile communication device.

According to a further aspect of the present invention, a non-transitory computer-readable recording medium having recorded thereon a program for preventing a device from departing from a route is provided, the method including a first code segment for generating moving-path related information to be shared among a plurality of mobile communication devices; a second code segment for generating, by a first mobile communication device among the plurality of mobile communication devices, moving-path related information regarding a moving path generated by movement of the first mobile communication device; a third code segment for transmitting the moving-path related information of the first mobile communication device to a central server to which the plurality of mobile communication devices are connected, the moving-path related information of the first mobile communication device transmitted to the central server being provided to at least one other mobile communication device of the plurality of mobile communication devices connected to the central server; a fourth code segment for storing the generated moving-path related information in a database; a fifth code segment for registering the moving path of the generated moving-path related information in a moving-path history, registering in the moving-path history comprising, if the first mobile communication device generates first moving-path related information regarding a first moving path, determining whether a second moving path included in a range similar to a first moving path of the first moving-path related information has been registered among existing moving paths registered in the moving-path history; a sixth code segment for updating accumulated data of statistical data of the second moving path based on the first moving path and statistical values based on the accumulated data, according to whether the second moving path has been registered as a result of the determination; a seventh code segment for comparing the first moving path with the second moving path in real time to determine whether the first moving path runs along the second moving path; and an eight code segment for performing a moving-path deviation indicating operation indicating moving-path deviation of the first mobile communication device, based on whether the first moving path deviates from the second moving path as a result of the real time determination.

According to another aspect of the present invention, a mobile communication device is provided for generating moving-path information among a plurality of mobile communication devices, the mobile communication device including a moving-path related information generating unit generating moving-path related information regarding a moving path of a first mobile communication device among the plurality of mobile communication devices; a moving-path related information storing unit storing the moving-path related information in a database and registering the moving path of the moving-path related information in a moving-path history; and a moving-path related information transmitting unit transmitting the generated moving-path related information to a central server to which the plurality of mobile communication devices are connected, wherein the moving-path related information transmitted to the central server is provided to at least one other mobile communication device of the plurality of mobile communication devices connected to the central server, wherein registering in the moving-path history includes, in response to the first mobile communication device generating first moving-path related information regarding a first moving path, determining whether a second moving path included in a range similar to a first moving path of the first moving-path related information has been registered among existing moving paths registered in the moving-path history, and the moving-path related information storing unit is configured to update accumulated data of statistical data of the second moving path based on the first moving path and statistical values based on the accumulated data, according to whether the second moving path has been registered as a result of the determination; comparing the first moving path with the second moving path in real time to determine whether the first moving path runs along the second moving path; and performing a moving-path deviation indicating operation indicating moving-path deviation of the first mobile communication device, according to whether the first moving path deviates from the second moving path as a result of the real-time comparison and determination.

According to another aspect of the present invention, a non-transient computer-readable recording medium is provided having recorded thereon a program for executing a method of generating moving-path related information to be shared among a plurality of mobile communication devices, with the method including generating, by a first mobile communication device among the plurality of mobile communication devices, moving-path related information regarding a moving path generated by movement of the first mobile communication device; transmitting the moving-path related information of the first mobile communication device to a central server to which the plurality of mobile communication devices are connected, the moving-path related information of the first mobile communication device transmitted to the central server being provided to at least one other mobile communication device of the plurality of mobile communication devices connected to the central server; storing the generated moving-path related information in a database; registering the moving path of the generated moving-path related information in a moving-path history, registering in the moving-path history comprising, in response to the first mobile communication device generating first moving-path related information regarding a first moving path, determining whether a second moving path included in a similar range to a first moving path of the first moving-path related information has been registered among existing moving paths registered in the moving-path history; updating accumulated data of statistical data of the second moving path based on the first moving path and statistical values based on the accumulated data, according to whether the second moving path has been registered as a result of the determination; comparing the first moving path with the second moving path in real time to determine whether the first moving path runs along the second moving path; and performing a moving-path deviation indicating operation indicating moving-path deviation of the first mobile communication device, according to whether the first moving path deviates from the second moving path as a result of the real-time comparison and determination.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
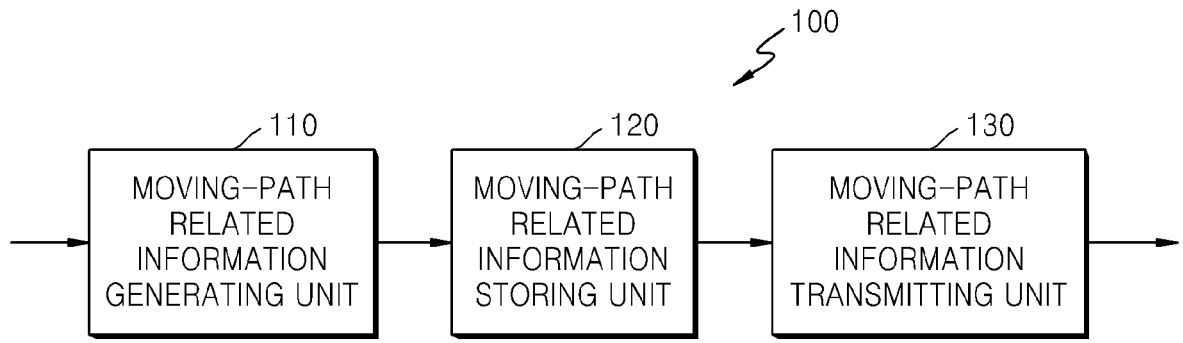
FIG. 1 is a block diagram of a first mobile communication device, which generates moving-path related information, among a plurality of mobile communication devices capable of sharing a moving path, according to a first embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

With reference to FIGS. 1 through 16, a description will be made regarding a method of generating, managing, and sharing moving-path related information among a plurality of mobile communication devices capable of obtaining position information and guiding moving paths through a central server to which the plurality of mobile communication devices are connected. A description will also be made of a structure of a network for sharing moving-path related information according to an embodiment of the present invention.

Hereinafter, embodiments of a structure of a network for sharing moving-path related information among a plurality of mobile communication devices through a central server to which the plurality of mobile communication devices are connected will be described with reference to FIGS. 1, 2, and 3. More specifically, in a moving-path related information sharing network (sharing network) according to a first embodiment of the present invention, a first mobile communication device generates and shares moving-path related information regarding a moving path formed by movement of the first mobile communication device. In a sharing network according to a second embodiment of the present invention, moving-path related information of the first mobile communication device generated by the central server is shared.

For convenience, a mobile communication device, which provides moving-path related information, may be referred to as the first mobile communication device, and a mobile communication device, which is provided with moving-path related information, may be referred to as the second mobile communication device.

FIG. 1 is a block diagram of a mobile communication device 100, which generates and provides moving-path related information, according to the first embodiment of the present invention. FIG. 2 is a block diagram of a central server 200, which generates and manages moving-path related information, according to the second embodiment of the present invention. FIG. 3 is a block diagram of a mobile communication device 30, which is provided with and shares moving-path related information, according to the first and second embodiments of the present invention.

The moving-path related information according to embodiments of the present invention may include waypoint information, route information, and additional information related to a moving path. The waypoint indicates a particular point, and the waypoint information, according to embodiments of the present invention, may include information indicating at least one arbitrary point selected in a moving path.

The route indicates consecutive geographical positions on an interval between predetermined points in the moving path, and may indicate positions periodically measured by a sensor of a mobile communication device. The route information, according to embodiments of the present invention, may include at least one of coordinate information, passing time information, and interval information of each geographical position.

The waypoint information and the route information of the moving-path related information, according to embodiments of the present invention, may be the position information obtained by a sensor which senses a Global Positioning System (GPS) signal or geographical information set by user input.

The additional information related to the moving path, according to embodiments of the present invention, may include various information related to a particular point in the moving path of the first mobile communication device 100. For example, the various information may include a geographical name of the particular point, a name of a neighboring principal place, a name of a road, an administrative address, and so forth.

Information about a bus stop, a subway station, and the like around an area through which the first mobile communication device 100 passes may also be used as the additional information related to the moving path. In addition, position information based on the coverage of a relay station of mobile communication devices and geographical description input by a user may be used as the additional information related to the moving path.

Moreover, the additional information related to the moving path according to embodiments of the present invention may include information, such as traffic conditions, which changes in real time in relation to a particular point in the moving path.

The additional information according to embodiments of the present invention may also include various data, e.g., text data, voice data, and video data, which are related to the moving path, without a limit. For example, image data or video data obtained by photographing a particular point in the moving path with a photographing device of the first mobile communication device 100, and voice data recorded at the particular point, may be used as the additional information. Text information, which records position description information for describing the particular point by the user, may also be used as the additional information.

Such additional information may be generated by user input or downloaded through the web.

FIG. 1 is a block diagram of the first mobile communication device 100, which generates moving-path related information, among a plurality of mobile communication devices capable of sharing a moving path, according to the first embodiment of the present invention.

The first mobile communication device 100, which generates and provides the moving-path related information, according to the first embodiment of the present invention, includes a moving-path related information generating unit 110, a moving-path related information storing unit 120, and a moving-path related information transmitting unit 130.

The moving-path related information generating unit 110, according to the first embodiment of the present invention, generates moving-path related information regarding a moving path formed by movement of the first mobile communication device 100. The moving-path related information, according to embodiments of the present invention, may include waypoint information, route information, and additional information related to the moving path of the first mobile communication device 100.

The additional information related to the moving path, according to the first embodiment, may be generated and updated, according to whether the waypoint or route information is obtained, or by user input of the first mobile communication device 100. The additional information regarding the moving path may be shared data downloaded through the web or may include tag information regarding data on the web. Depending on security settings of the sharing network, according to the first embodiment of the present invention, the additional information regarding the moving path may be shared only between mobile communication devices registered in the sharing network.

Also, the additional information related to the moving path, according to the first embodiment of the present invention, may be updated at a point in time when a counterpart mobile communication device connected to the central server receives the moving-path related information of the first mobile communication device. The updated additional information may be forwarded to the central server according to the first embodiment, and then to the counterpart mobile communication device through the central server according to the first embodiment.

The moving-path related information storing unit 120, according to the first embodiment, stores moving-path related information generated by the moving-path related information generating unit 110 in a database. The moving-path related information storing unit 120, according to the first embodiment, may add an index to the moving path and then store the moving path. In particular, the moving-path related information storing unit 120 may analyze frequency in pass-through of a moving path and may establish a database with the moving-path related information. By establishing the database, it is possible to generate moving path guidance considering personal path finding knowhow or moving path preference.

The moving-path related information transmitting unit 130, according to the first embodiment, transmits the moving-path related information to a first central server to which a plurality of mobile communication devices are connected. The moving-path related information of the first mobile communication device 100, which is transmitted to the first central server, may be then provided to at least one of the plurality of mobile communication devices connected to the first central server.

The moving-path related information of the first mobile communication device 100 transmitted to the first central server from the moving-path related information transmitting unit 130, according to the first embodiment, may be stored in the first central server and then read out at the provisioning request of the second mobile communication device 30 connected to the first central server, for transmission to the second mobile communication device 30.

The moving-path related information of the first mobile communication device 100 transmitted to the first central server from the moving-path related information transmitting unit 130, according to the first embodiment, may be transmitted in real time through the first central server to the second mobile communication device 30 connected to the first central server.

The moving-path related information may be directly transmitted from the moving-path related information transmitting unit 130, according to the first embodiment, to at least one of a plurality of mobile communication devices connected to the first central server.

A plurality of mobile communication devices, which desire to share the moving-path related information, may be authenticated with respect to the first central server and then registered in the first central server. Users of the plurality of mobile communication devices registered in the first central server may be members of a particular group. For example, it is necessary to share, between family members, geographical information related to a moving path that is frequently used within an area of common life. Family members can share moving-path related information after authenticating and registering their mobile communication devices in a home server.

The moving-path related information storing unit 120, according to the first embodiment, may register the moving path of the generated moving-path related information in a moving-path history. The moving path registered in the moving-path history may include geographical information such as waypoint information and route information.

The moving-path related information generating unit 110, according to the first embodiment, if generating first moving-path related information regarding a new moving path, may determine whether a second moving path included in a range similar to a first moving path of the first moving-path related information has been registered among existing moving paths registered in the moving-path history.

When the moving-path related information generating unit 110, according to the first embodiment, determines that the second moving path that is similar to the first moving path has not been registered in the moving-path history, the moving-path related information storing unit 120 may newly register the first moving path in the moving-path history. The moving-path related information storing unit 120, according to the first embodiment, may generate statistical data regarding the newly registered first moving path.

When the moving-path related information generating unit 110, according to the first embodiment, determines that the second moving path that is similar to the first moving path has been registered in the moving-path history, the moving-path related information storing unit 120 may update accumulated data of the statistical data of the second moving path. The moving-path related information storing unit 120, according to the first embodiment, may also update statistical values corresponding to the accumulated data of the second moving path based on the first moving path.

The moving-path related information generating unit 110, according to the first embodiment, may compare the first moving path with the second moving path in real time to determine whether the first moving path currently runs along the second moving path. The moving-path related information generating unit 110, according to the first embodiment, may compare at least one of waypoint information and route information of the first moving-path related information with waypoint information and route information of second moving-path related information.

For example, deviation of at least one of a path, coordinates, and a speed based on at least one of the waypoint information and the route information of the first moving-path related information from the normal distributions of the waypoint information and the route information of the second moving-path related information may be a determination factor for determination of moving-path deviation.

If the moving-path related information generating unit 110, according to the first embodiment, determines that the first moving path runs along the second moving path as a result of the real-time comparison and determination, the statistical data of the second moving path may be updated based on the updated first moving path.

If the moving-path related information generating unit 110, according to the first embodiment, determines that the first moving path deviates from the second moving path as a result of the real-time comparison and determination, the first mobile communication device 100 according to the first embodiment may perform a moving-path deviation indicating operation. The moving-path deviation indicating operation, according to the first embodiment, may include an operation of generating a moving-path deviation alarm sound, an operation of displaying a moving-path deviation alarm window on a display screen of the first mobile communication device 100, and an operation of generating a vibration indicating moving-path deviation.

If the first moving path is changed with normal moving-path related information by user input on the first mobile communication device 100, the moving-path related information storing unit 120, according to the first embodiment, may update the accumulated data of the statistical data of the second moving path based on the first moving path.

Figure 2:
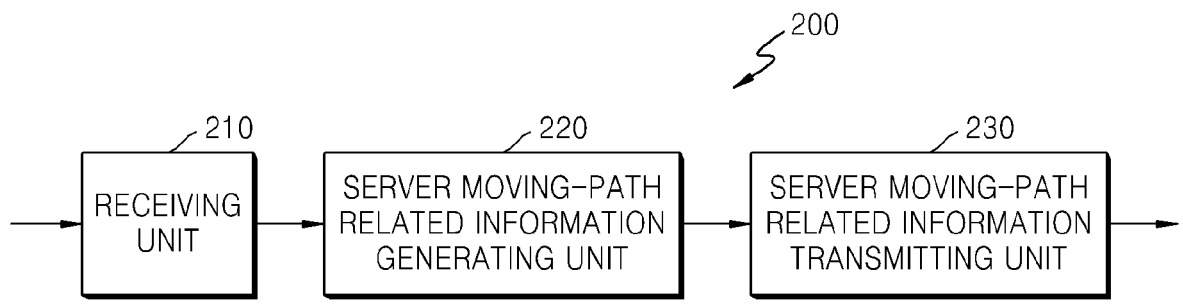
FIG. 2 is a block diagram of a central server, which manages moving-path related information for sharing of moving paths among a plurality of mobile communication devices, according to a second embodiment of the present invention.

FIG. 2 is a block diagram of the central server 200, which manages moving-path related information for sharing of moving paths among a plurality of mobile communication devices, according to the second embodiment of the present invention.

The central server 200, according to the second embodiment, includes a receiving unit 210, a server moving-path related information generating unit 220, and a server moving-path related information transmitting unit 230. A plurality of mobile communication devices may be connected to the central server 200. For convenience, the central server 200, according to the second embodiment, may be referred to as the second central server 200.

The second central server 200 may authenticate a plurality of mobile communication devices and register authenticated mobile communication devices as mobile communication devices among which moving-path related information can be shared.

The receiving unit 210, according to the second embodiment, receives, from the first mobile communication device among a plurality of mobile communication devices, geographical information related to a moving path generated by movement of the first mobile communication device. The geographical information may include waypoint information and route information related to the moving path.

The server moving-path related information generating unit 220, according to the second embodiment, generates moving-path related information of the first mobile communication device, which includes the geographical information received by the receiving unit 210 and additional information related to the moving path. Specifically, the server moving-path related information generating unit 220 may generate moving-path related information including waypoint information, route information, and additional information related to the moving path.

If the receiving unit 210, according to the second embodiment, receives additional information related to the moving path of the first mobile communication device from the first mobile communication device, the server moving-path related information generating unit 220 may generate moving-path related information including the received additional information together with the received waypoint information and route information.

The receiving unit 210, according to the second embodiment, may receive a request for generating additional information related to the moving path of the first mobile communication device from the first mobile communication device. In this case, the server moving-path related information generating unit 220, according to the second embodiment, may generate the additional information related to the moving path of the first mobile communication device, based on the waypoint information and route information received by the receiving unit 210.

The server moving-path related information generating unit 220, according to the second embodiment, may generate moving-path related information of the first mobile communication device, which includes the waypoint information and route information received by the receiving unit 210, together with the generated additional information.

The server moving-path related information generating unit 220, according to the second embodiment, may search for data through the web to generate the additional information related to the moving path of the first mobile communication device. Alternatively, the server moving-path related information generating unit 220, according to the second embodiment, may download various additional information related to a moving path from an additional information server of a service provider which provides a moving path sharing service. The additional information related to the moving path may further include tag information regarding the data found through the web.

The additional information related to the moving path, according to the second embodiment, may be updated at a point in time when a counterpart mobile communication device connected to the second central server 200 receives the moving-path related information of the first mobile communication device. The updated additional information may be forwarded to the second central server 200 and then to the counterpart mobile communication device through the central server 200, according to the second embodiment.

The server moving-path related information transmitting unit 230, according to the second embodiment, may transmit the received moving-path related information of the first mobile communication device to at least one of the plurality of mobile communication devices connected to the second central server 200.

The second central server 200 may receive a request for transmitting the moving-path related information of the first mobile communication device from at least one second mobile communication device among the plurality of mobile communication devices. The moving-path related information transmitting unit 230, according to the second embodiment, may forward the moving path related information of the first mobile communication device, which is generated by the second central server 200, at the request of the second mobile communication device, to the second mobile communication device.

Alternatively, the server moving-path related information transmitting unit 230, according to the second embodiment, may transmit the moving-path related information of the first mobile communication device, which is generated by the second central server 200, to the second mobile communication device, on a real time basis.

The second central server 200 may store the moving-path related information of the first mobile communication device, which is generated by the server moving-path related information generating unit 220, according to the second embodiment, in a database of each mobile communication device.

The second central server 200 may register the moving path of the moving-path related information stored in the database of the first mobile communication device in the moving-path history.

The server moving-path related information generating unit 220, according to the second embodiment, if generating third moving-path related information regarding a new moving path, determines whether a fourth moving path included in a range similar to the third moving path of the third moving-path related information has been registered among existing moving paths registered in the moving-path history.

When the server moving-path related information generating unit 220, according to the second embodiment, determines that the fourth moving path similar to the third moving path has not been registered in the moving-path history, the second central server 200 may newly register the third moving path in the moving-path history. The second central server 200 may generate statistical data regarding the newly registered third moving path.

When the server moving-path related information generating unit 220, according to the second embodiment, determines that the fourth moving path similar to the third moving path has been registered in the moving-path history, the second central server 200 may update accumulated data of statistical data of the fourth moving path based on the third moving path. The second central server 200 may also update statistical values corresponding to the accumulated data of the fourth moving path.

The server moving-path related information generating unit 220, according to the second embodiment, may compare the third moving path with the fourth moving path in real time to determine whether the third moving path currently runs along the fourth moving path. The server moving-path related information generating unit 220, according to the second embodiment, may compare at least one of waypoint information and route information of the third moving-path related information with waypoint information and route information of fourth moving-path related information.

For example, deviation of at least one of a path, coordinates, and a speed based on at least one of the waypoint information and the route information of the third moving-path related information from the normal distributions of the waypoint information and the route information of the fourth moving-path related information may be determination factors for determination of moving-path deviation.

If the server moving-path related information generating unit 220, according to the second embodiment, determines that the third moving path runs along the fourth moving path as a result of the real-time comparison and determination, the statistical data of the fourth moving path may be updated based on the updated third moving path.

If the server moving-path related information generating unit 220, according to the second embodiment, determines that the third moving path deviates from the fourth moving path as a result of the real-time comparison and determination, the second central server 200 may transmit moving-path deviation alarm information to the first mobile communication device.

If the third moving path is changed with normal moving-path related information by user input on the first mobile communication device, the second central server 200 may update the accumulated data of the statistical data of the fourth moving path based on the third moving path.

When the second central server 200 is a home server, a user of each of the first mobile communication device and the second mobile communication device may be a member of a particular group, such as family members or co-workers.

The receiving unit 210, according to the second embodiment, may register moving paths of moving-path related information received from at least one of the plurality of mobile communication devices in a moving-path history. Thus, the second central server 200 may generate statistical data regarding a fifth moving path based on the moving-path related information received from the plurality of mobile communication devices.

When the receiving unit 210, according to the second embodiment, receives sixth moving-path related information from the first mobile communication device, if the second central server 200 determines that the fifth moving path is similar to a sixth moving path among the other plurality of mobile communication devices registered in the moving-path history, the second central server 200 may update the statistical data regarding the fifth moving path based on the statistical data of the sixth moving path.

The second central server 200 may generate moving-path related information to be recommended to the second mobile communication device, based on moving-path related information accumulated by the plurality of mobile communication devices. For example, the second central server 200 may analyze the statistical data of the fifth moving path to generate recommended moving-path related information including a shortest-distance path corresponding to the fifth moving path, a way to move by public transportation, a shortest-time path based on traffic conditions, and a principal local place. Thus, if the second central server 200 determines that the fifth moving path registered in the moving-path history is similar to the sixth moving path, recommended moving-path related information of the fifth moving path may be transmitted for the sixth moving path.

Figure 3:
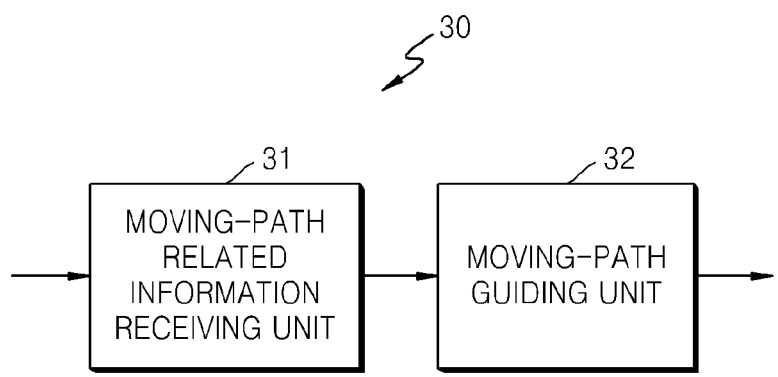
FIG. 3 is a block diagram of a second mobile communication device, which is provided with and shares moving-path related information, among a plurality of mobile communication devices capable of sharing a moving path, according to embodiments of the present invention.

FIG. 3 is a block diagram of the second mobile communication device, which is provided with and shares moving-path related information among a plurality of mobile communication devices capable of sharing moving-path related information therebetween.

The second mobile communication device 30, which is provided with and shares moving-path related information, according to embodiments of the present invention, includes a moving-path related information receiving unit 31 and a moving-path guiding unit 32. The second mobile communication device 30 may be a second mobile communication device with respect to the first mobile communication device 100, according to the first embodiment described with reference to FIG. 1, or a second mobile communication device with respect to the central server 200, according to the second embodiment described with reference to FIG. 2.

The moving-path related information receiving unit 31 receives moving-path related information generated by movement of the first mobile communication device 100 from a central server to which a plurality of mobile communication devices are connected. In the case of a sharing network 300, according to the first embodiment, the moving-path related information receiving unit 31 may receive moving-path related information generated by the first mobile communication device 100. In case of a sharing network 350, according to the second embodiment, the moving-path related information receiving unit 31 may receive moving-path related information of the first mobile communication device, which is generated by the second central server 200.

The second mobile communication device 30, according to embodiments of the present invention, may request the central server to provide the moving-path related information of the first mobile communication device. Thus, the moving-path related information receiving unit 31 may receive the moving-path related information of the first mobile communication device, which is transmitted in real time through the central server according to the first embodiment or the central server 200 according to the second embodiment.

The second mobile communication device 30, according to embodiments of the present invention, may also request the first mobile communication device 100 to provide the moving-path related information of the first mobile communication device 100. In this case, the moving-path related information receiving unit 31 may receive the moving-path related information of the first mobile communication device 100, which is directly transmitted from the first mobile communication device 100 according to the first embodiment.

The moving-path guiding unit 32 may share the received moving-path related information of the first mobile communication device and performs moving path guidance by using the shared moving-path related information.

The moving-path related information, according to embodiments of the present invention, may include waypoint information, route information, and additional information. Based on the waypoint information and the route information of the moving-path related information, the moving-path guiding unit 32 may determine whether the moving path of the second mobile communication device 30 runs along the moving path of the first mobile communication device. The moving-path guiding unit 32 may perform a moving-path deviation indicating operation if the current moving path of the second mobile communication device 30 deviates from a shared moving path. For example, the second mobile communication device 30 may generate an alarm sound or vibration indicating moving-path deviation or may display an alarm window on the display screen.

The moving-path guiding unit 32 may recommend a shortest-distance path corresponding to the current moving path, a way to move by public transportation, a shortest-time path based on traffic conditions, and a principal local place, based on the additional information of the moving-path related information. For example, the moving-path guiding unit 32 may obtain information about public transportation and a stop available in a predetermined moving path through the web. The moving-path guiding unit 32, according to an embodiment, may obtain recommended moving-path related information, such as, a shortest-distance path corresponding to the moving path of the first mobile communication device 100, a way to move by public transportation, a shortest-time path based on traffic conditions, and a principal local place, directly from the Internet.

The moving-path guiding unit 32 may also recommend at least one of a shortest-distance path corresponding to the moving path of the first mobile communication device 100, a way to move by public transportation, a shortest-time path based on traffic conditions, and a principal local place, based on the recommended moving-path related information received from the second central server 200.

Although the first mobile communication device and the second mobile communication device according to embodiments of the present invention have been described as being separated from each other, an entity for providing moving-path related information and an entity being provided with the moving-path related information are not necessarily separated from each other.

For example, all components of the first mobile communication device and the second mobile communication devices may be included in a single mobile communication device. A predetermined mobile communication device may transmit moving-path related information to a central server to share first moving-path related information obtained by a component of the first mobile communication device, and may receive and share moving-path related information to be shared with other mobile communication devices connected to the central server through all components of the second mobile communication device.

Group members having similar activity areas may have similar moving paths in the activity areas. If one of the group members knows a shortcut from previous experience, it may be desirable to share information about the shortcut between the group members. Hence, by using a plurality of mobile communication devices which share moving-path related information through a central server to which the mobile communication devices are connected according to embodiments of the present invention, information corresponding to a moving path of a member who knows the shortcut may be shared between the members.

In addition, information about the moving path of a member is shared with the other group members through the central server 200, thus facilitating sharing of the information about the moving path with members having a long distance therebetween. Moreover, geographical information can be expressed considering additional information in various formats for describing a geographical position, such as image data and address information, as well as geographical information like a map, thereby expressing a moving path in an easy-to-understand and intuitive manner.

Furthermore, by accumulating statistical data regarding moving-path related information and performing statistical analysis using the accumulated statistical data, accurate moving-path related information is accumulated and thus accurate moving-path related information can be generated and shared.

Figure 4:
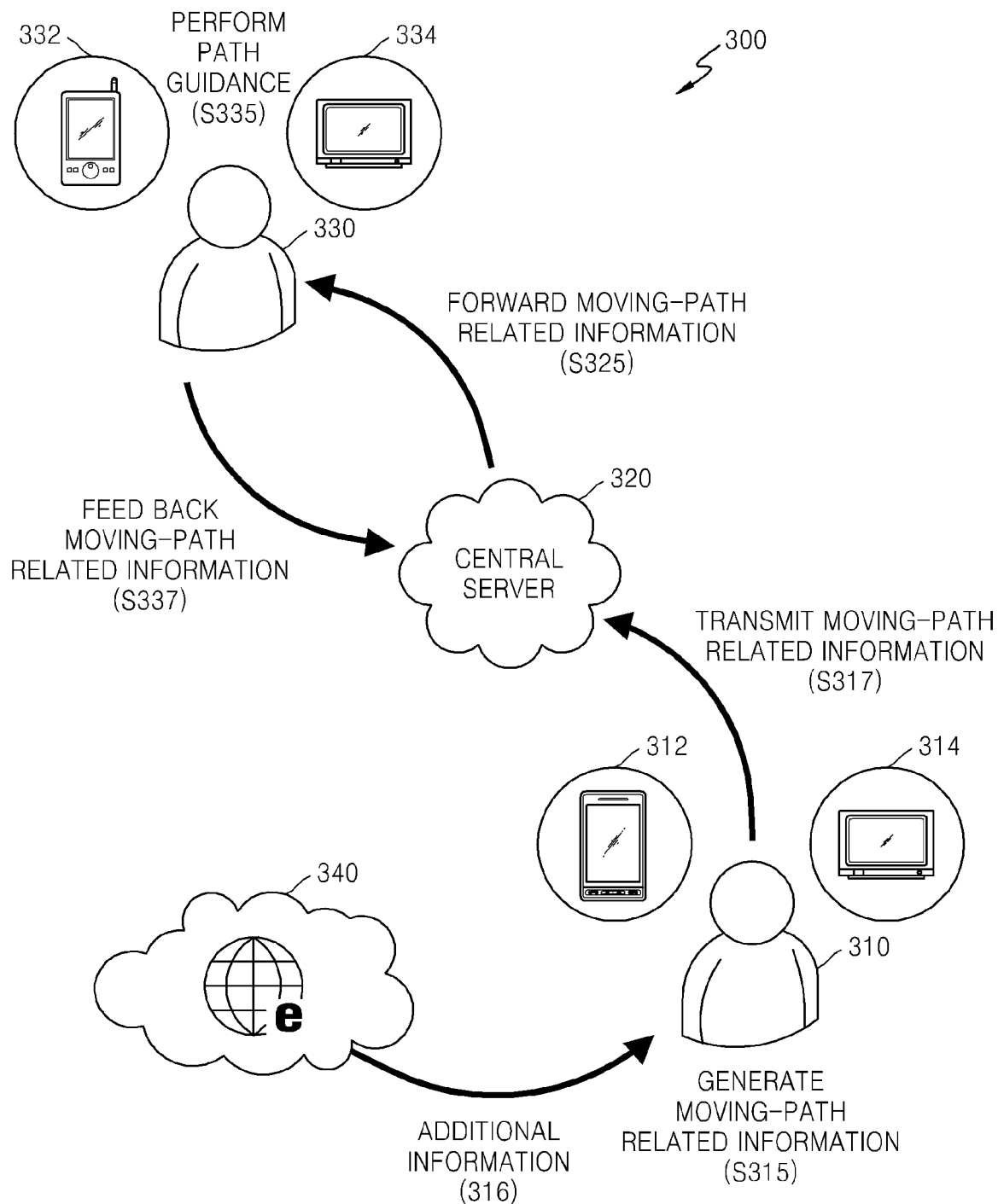
FIG. 4 is a diagram illustrating a network for sharing moving-path related information among a plurality of mobile communication devices through a central server, according to the first embodiment of the present invention.

FIG. 4 illustrates a sharing network 300 for moving-path related information among a plurality of mobile communication devices through a central server, according to the first embodiment of the present invention.

The sharing network 300 according to the first embodiment includes a first user 310, a central server 320, and a second user 330. The first user 310 carries the first mobile communication device 100 described with reference to FIG. 1, and the second user 330 carries the second mobile communication device 30 described with reference to FIG. 3. The central server 320 may correspond to the central server described with reference to FIG. 1.

The first mobile communication device 100 of the first user 310 may be a cellular phone 312 or a navigation system 314. Similarly, the second mobile communication device 30 of the second user 330, which is capable of performing moving-path guidance, may be a cellular phone 332 or a navigation system 334. The first user 310 and the second user 330 may be members of a particular group, such as members of a family.

According to a moving path of the first user 310 carrying the first mobile communication device 312 or 314, the first mobile communication device 312 or 314 may generate moving-path related information in operation S315. When generating the moving-path related information, the first mobile communication device 312 or 314 may use additional information 316 related to the moving path.

The moving-path related additional information 316 may include data generated by input of the first user 310 to the first mobile communication device 312 or 314, and data downloaded through the web 340. For example, information about a name indicating a current point, a name of a principal place in the vicinity of the current point, and an administrative address of the current point may be generated through input of the first user 310.

The additional information 316, such as information about public transportation in the moving path, information about a principal place in the moving path, information about traffic conditions, and status change update information of a moving path may be added to the moving-path related information of the first mobile communication device 312 or 314. The additional information 316 may be downloaded or updated through the web 340.

The first mobile communication device 100 may obtain the additional information 316 by searching for common data on the web 340. The first mobile communication device 100 may also obtain the additional information 316 from a separate server for providing the moving-path related additional information, which is run by a provider of a moving-path sharing service.

Since the moving-path related information of the first user 310 is thought to be useful for other family members residing in the same zone, the first user 310 transmits the moving-path related information generated by the first mobile communication device 312 or 314 to the central server 320 in step S317.

The central server 320, according to the first embodiment, forwards the moving-path related information received from the first mobile communication device 312 or 314 of the first user 310 to the second mobile communication device 332 or 334 of the second user 330 in operation S325. In this case, as the second mobile communication device 332 or 334 of the second user 330 transmits a call for requesting sharing of the moving-path related information with the first user 310 to the central server 320, the central server 320 may transmit the moving-path related information of the first user 310 to the second mobile communication device 332 or 334.

In operation S335, the second user 330 may perform path guidance along the moving path of the first user 310, by using the moving-path related information of the first user 310 received from the central server 320. The second mobile communication device 332 or 334 of the second user 330 may feed back a result of the moving-path guidance to the central server 320 in operation S337.

The second mobile communication device 332 or 334 of the second user 330 may request the central server 320 to update the moving-path related information of the first mobile communication device 312 or 314 and its related statistical data according to the moving-path guidance. New moving-path related information obtained directly by the second mobile communication device 332 or 334 may also be transmitted to the central server 320 so that the obtained information can be shared between members on the sharing network, according to the first embodiment.

Figure 5:
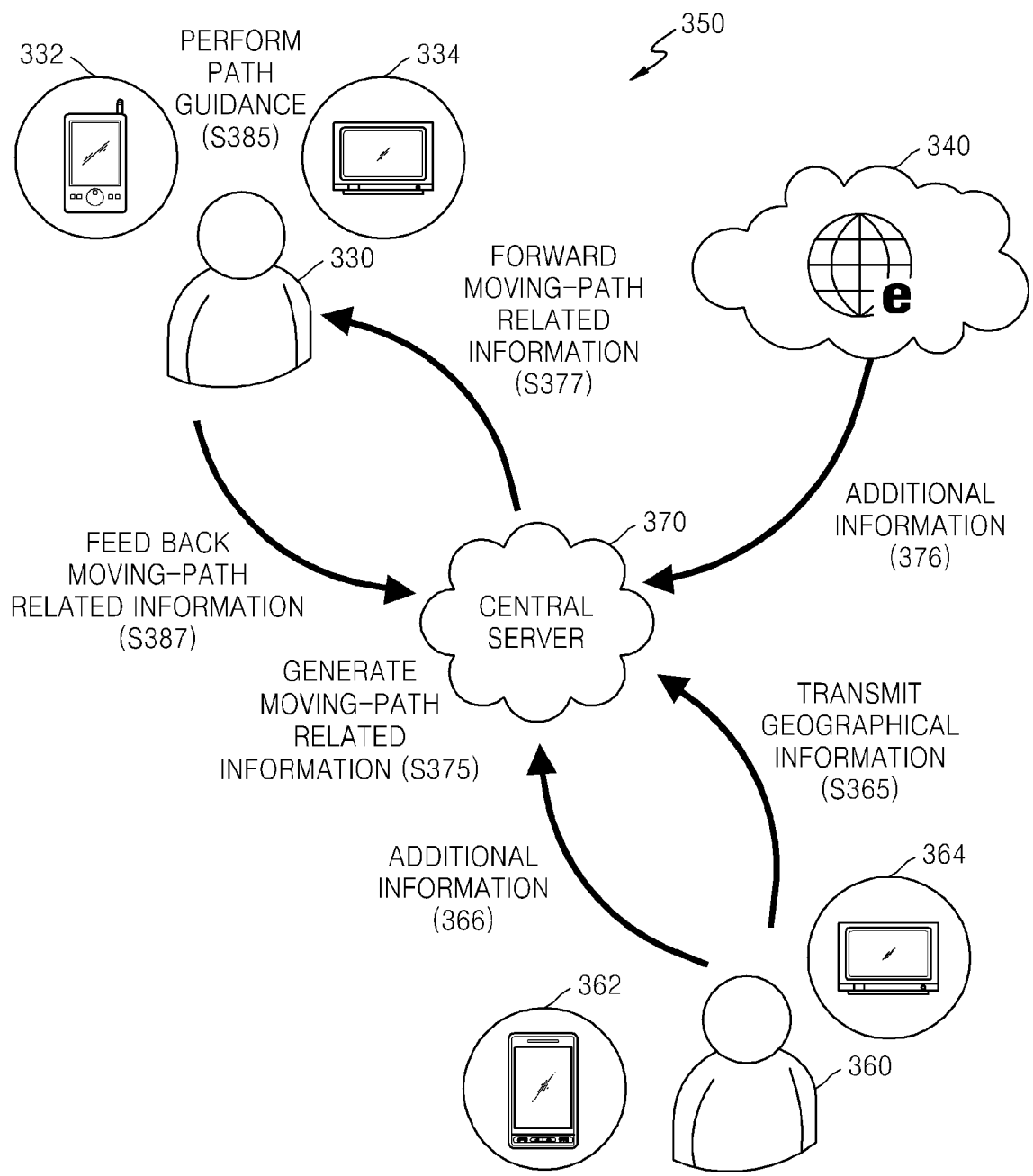
FIG. 5 is a diagram illustrating a network for sharing moving-path related information among a plurality of mobile communication devices through a central server, according to the second embodiment of the present invention.
Figure 6:
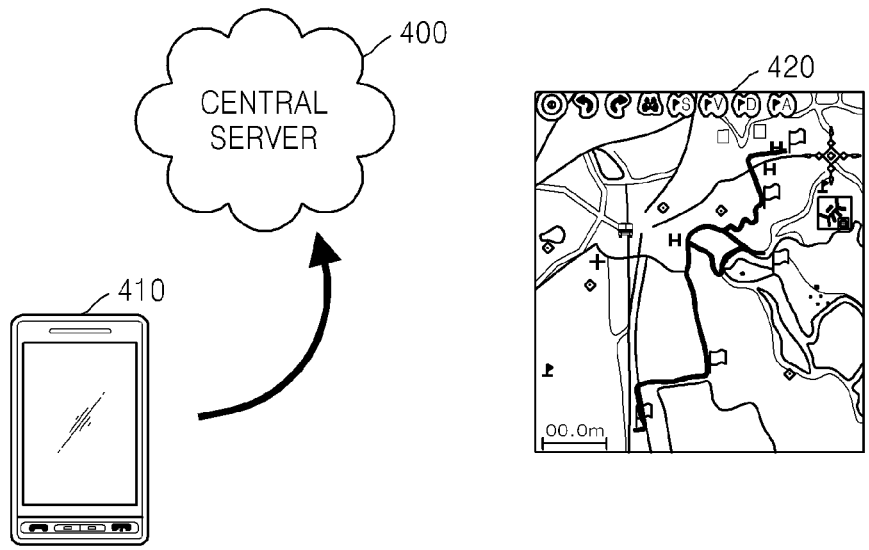
FIGS. 6, 7, 8, and 9 are views for describing a method of sharing moving-path related information, according to embodiments of the present invention.
Figure 7:
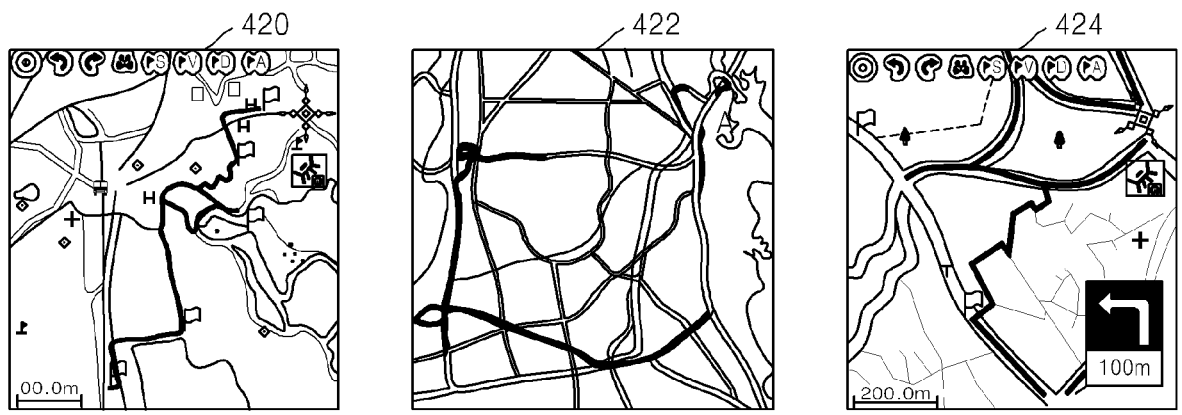
Figure 7:
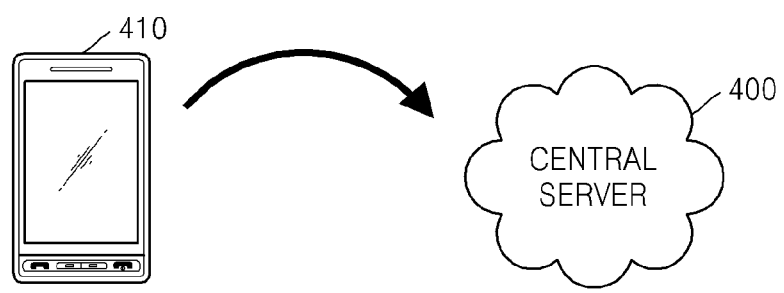
Figure 8:
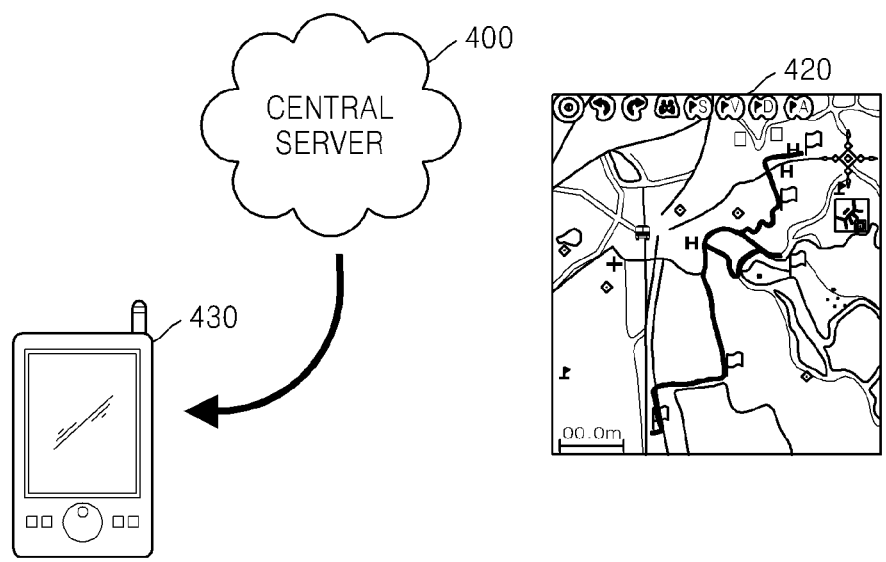
Figure 9:
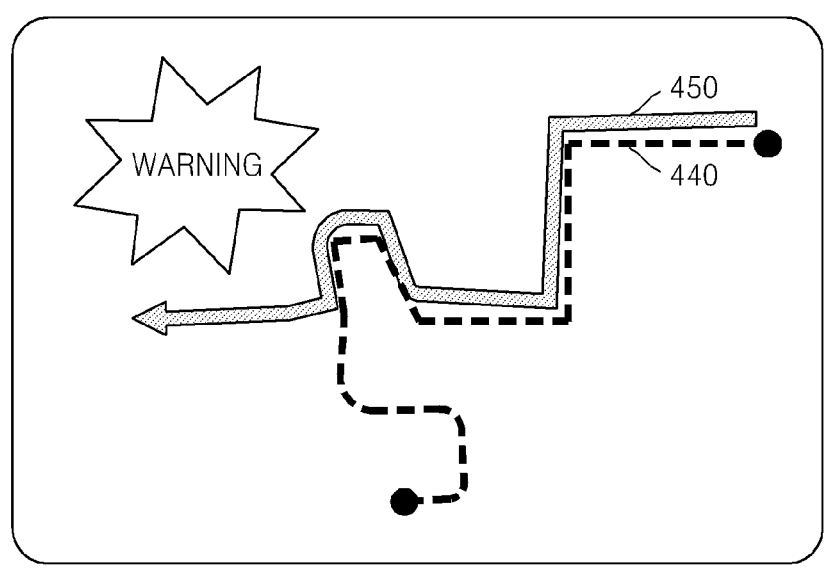

FIG. 5 illustrates a sharing network 350 for moving-path related information among a plurality of mobile communication devices through a central server, according to the second embodiment of the present invention.

The sharing network 350, according to the second embodiment, includes a first user 360, a central server 370, and the second user 330. The first user 360 carries the first mobile communication device described with reference to FIG. 2, and the second user 330 carries the second mobile communication device 30 described with reference to FIG. 3. The central server 370 corresponds to the second central server 200 described with reference to FIG. 2. The first mobile communication device of the first user 360 may be a cellular phone 362 or a navigation system 364.

According to a moving path of the first user 360 carrying the first mobile communication device described with reference to FIG. 2, the first mobile communication device 362 or 364 transmits waypoint information and route information, which are related to the moving path, to the central server 370 in operation S365.

In operation S375, the central server 370 then generates moving-path related information of the first user 360 by using the waypoint information and route information received from the first mobile communication device 362 or 364. The moving-path related information may include various additional information 366 and 376 related to the moving path.

The central server 370, according to the second embodiment, may receive the additional information 366 related to the moving path from the first mobile communication device. The central server 370 may receive a request for generating moving-path related additional information from the first mobile communication device.

The central server 370, according to the second embodiment, may search common data on the web 340 to obtain the additional information 376. The central server 370 may also obtain the additional information 376 from an additional information server related to the moving path.

The central server 370, according to the second embodiment, generates moving-path related information of the first mobile communication device 362 or 364 and then forwards the generated moving-path related information to the second mobile communication device 332 or 334 in operation S377. As the second mobile communication device 332 or 334 of the second user 330 transmits a call for requesting sharing of the moving-path related information with the first user 360 to the central server 370, the central server 370 may transmit the moving-path related information of the first user 360 generated therein to the second mobile communication device 332 or 334.

In operation S385, the second user 330 may perform path guidance along the moving path of the first user 360 by using the moving-path related information of the first user 360 received from the central server 370. The second mobile communication device 332 or 334 of the second user 330 may also feed back a result of the moving-path guidance to the central server 370, in operation S387. The second mobile communication device 332 or 334 of the second user 330 may request the central server 370 to update the moving-path related information of the first mobile communication device 362 or 364 and its related statistical data according to the moving-path guidance. New moving-path related information obtained directly by the second mobile communication device 332 or 334 may also be transmitted to the central server 370 so that the obtained information can be shared between members on the sharing network, according to the first embodiment.

Hereinafter, moving-path related information, according to embodiments of the present invention, will be described with reference to FIGS. 6 through 13. Additional information related to a moving path generated by movement of a first mobile communication device may be used in both moving path sharing networks of the first and second embodiments.

FIGS. 6, 7, 8, and 9 are views for describing a method of sharing moving-path related information, according to embodiments of the present invention.

In the networks for sharing moving-path related information according to the first embodiment and the second embodiment, a central server 400 registers a first mobile communication device 410 as a moving-path sharing device. A first user of the first mobile communication device 410 is authorized by the central server 400 to share moving-path related information. The following description is based on the assumption that the central server 400 is a server for authorizing co-workers of the first user to share moving-path related information.

In the case of the sharing network 300 according to the first embodiment, the first mobile communication device 410 generates moving-path related information including geographical information 420 regarding a moving path generated by movement of the first user from an office to a head office. The first mobile communication device 410 transmits the generated moving-path related information to the central server 400.

The geographical information 420 regarding the moving path from the office to the head office may include waypoint information and route information obtained from a GPS signal. In the sharing network according to the first embodiment, the first mobile communication device 410 may transmit moving-path related information corresponding to a business activity area of a co-worker of a user, each time obtaining the moving-path related information. For example, the first mobile communication device 410 may generate moving-path related information including the geographical information 420 regarding a moving path from an office to the head office, geographical information 422 regarding a moving path from the office to a bank for business, and geographical information 424 regarding a moving path from a bus terminal to a local branch. The first mobile communication device 410 may transmit the generated moving-path related information to the central server 400.

In the case of the sharing network 350 according to the second embodiment, the first mobile communication device 410 may transmit the geographical information 420, 422, or 424 for a corresponding moving path to the central server

400. The central server 400, according to the second embodiment, may generate moving-path related information including the geographic information 420, 422, or 424 received for a corresponding moving path.

A second mobile communication device 430 may receive moving-path related information transmitted from the central server 400 in the sharing networks of the first and second embodiments. For example, the second mobile communication device 430 may selectively receive, from the central server 400, at least one of the moving-path related information from the office to the head office, the moving-path related information from the office to the bank, and the moving-path related information from the bus terminal to the local branch in a moving path of a first co-worker of the first user.

When performing path guidance based on the moving-path related information including the geographical information 420 regarding a shared moving path 440, while on the move, the second mobile communication device 430 may compare the shared moving path 440 indicated by the geographical information 420 regarding the shared moving path 440 with a current moving path 450 of the second mobile communication device 430. If the current moving path 450 is not matched with the shared moving path 440, the second mobile communication device 430 may perform a moving-path deviation indicating operation indicating that the current moving path 450 deviates from the shared moving path 440.

Since the first mobile communication device 410 and the second mobile communication device 430 share geographical information regarding a moving path through the central server 400, a database of moving paths may be established taking account of the frequency of selection of a moving path by members, and a stable sharing service can be provided.

Figure 10:
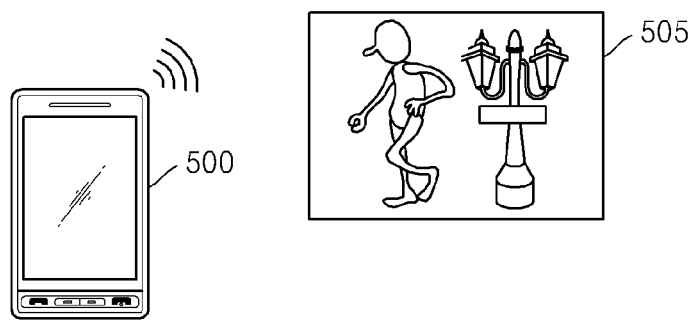
FIGS. 10, 11, and 12 are views for describing a method of sharing moving-path related information including additional information, according to embodiments of the present invention.
Figure 11:
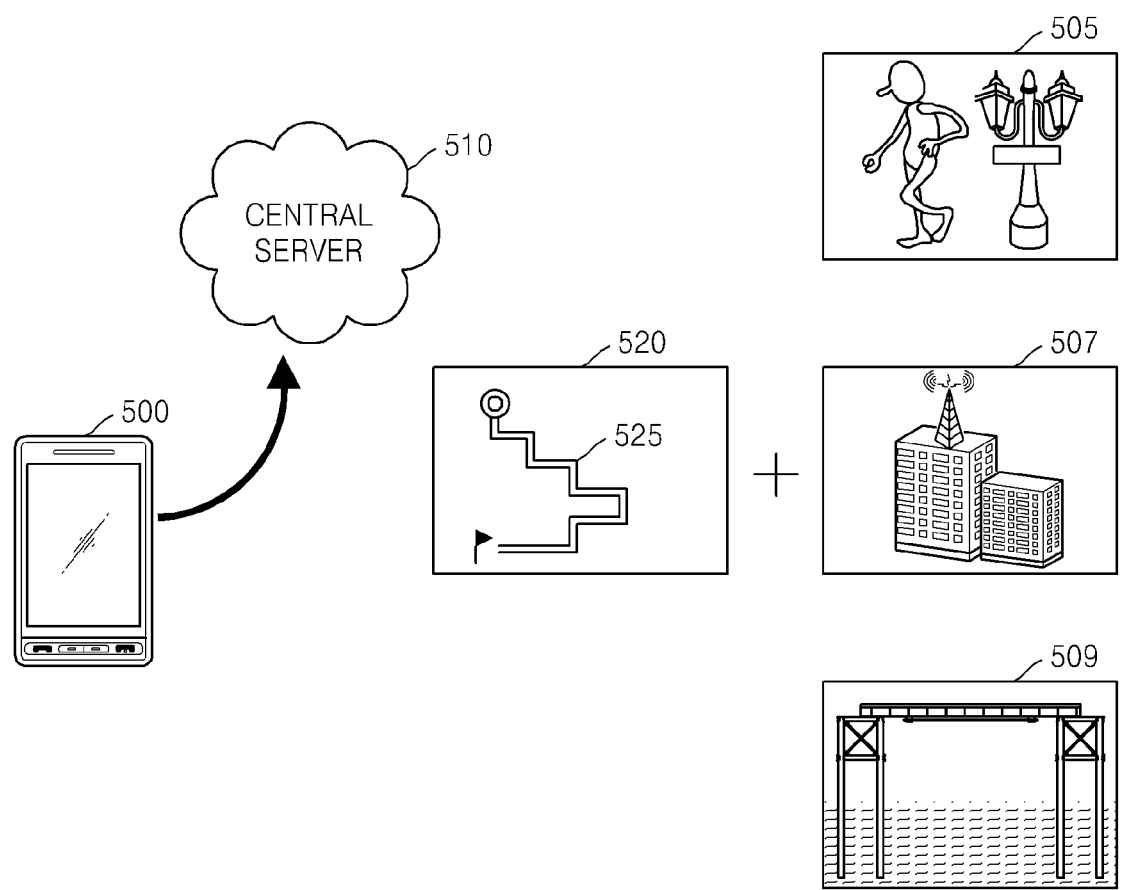
Figure 12:
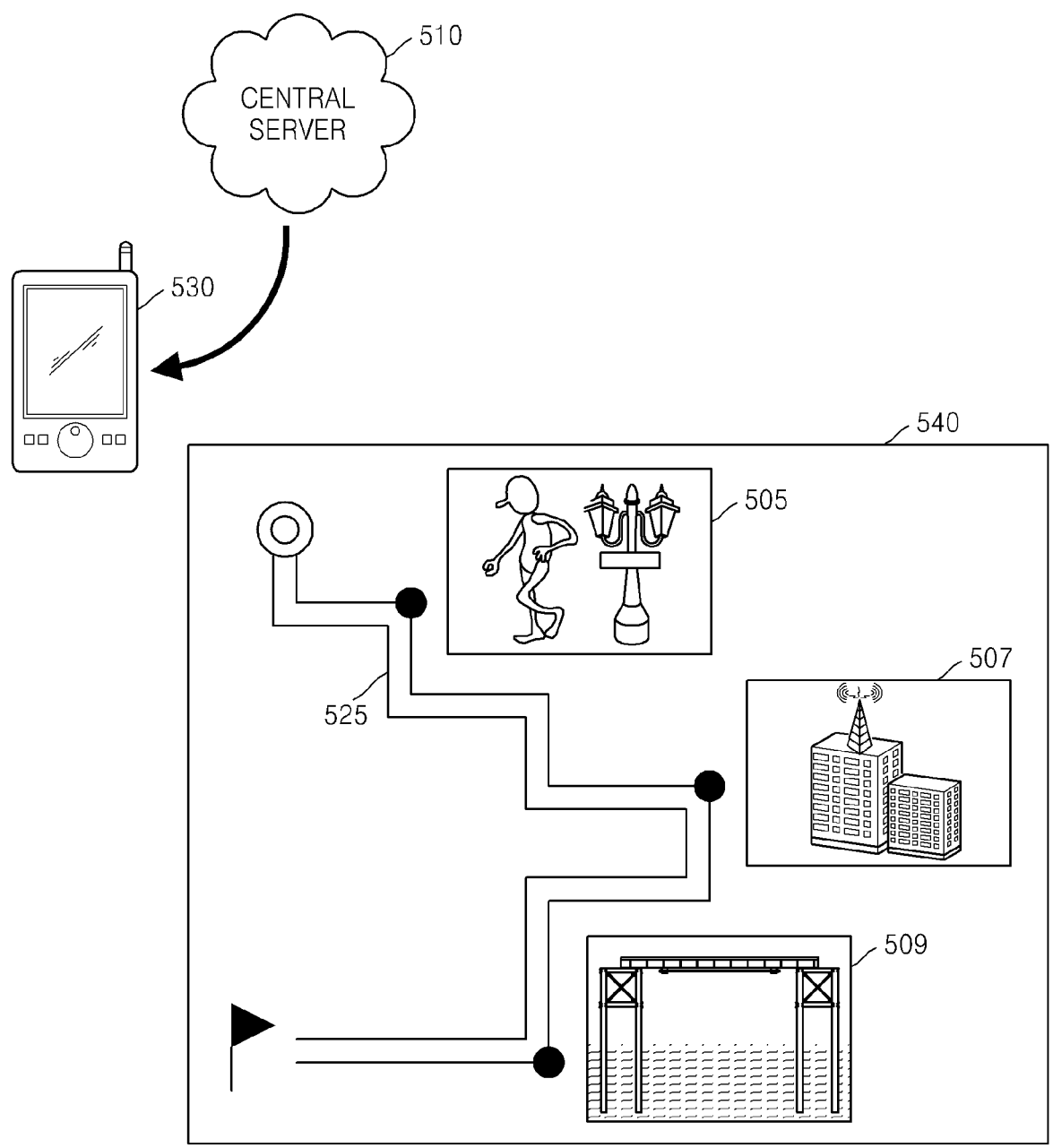

FIGS. 10, 11, and 12 are views for describing a method of sharing moving-path related information including additional information, according to embodiments of the present invention.

A first mobile communication device 500 may photograph an object, which may serve as a landmark, by using a camera device mounted thereon. The object serving as a landmark may be a structure such as a building, a statue, or a bridge, or a natural specialty such as a tree, a mountain, or a river, or a sign, without being limited to a particular thing.

During movement of the first mobile communication device 500, a user may photograph a famous statue as a landmark, thereby obtaining image data 505 of the statue. The first mobile communication device 500 may photograph a famous building and a bridge the user may access during the movement, thereby obtaining image data 507 of the building and image data 509 of the bridge.

In the case of the moving-path sharing network 300 according to the first embodiment, the first mobile communication device 500 generates moving-path related information including additional information such as the image data 505 of the statue, the image data 507 of the building, and the image data 509 of the bridge, which are obtained by photographing in the current moving path. The first mobile communication device 500 generates geographical information 520 regarding the current moving path, and transmits the generated moving-path related information to a central server 510.

In the case of the moving-path sharing network 350 according to the second embodiment, the first mobile communication device 500 may transmit the additional information such as the image data 505 of the statue, the image data 507 of the building, and the image data 509 of the bridge, which are obtained by photographing in the current moving path, together with the geographical information 520 regarding the current moving path, to the central server 510. Thus, the central server 510 may generate moving-path related information including the received geographical information 520 and the additional information such as the image data 505, 507, and 509.

The second mobile communication device 530 is authorized by a user of the first mobile communication device 500 or the central server 510 to access moving-path related information 540, and then receives the moving-path related information 540 through the central server 510. In this case, the moving-path related information 540 may be collective data where the image data 505 of the statue is inserted at a position of the statue, the image data 507 of the building is inserted at a position of the building, and the image data 509 of the bridge is inserted at a position of the bridge along a moving path 525 of the geographical information 520. If it is difficult to directly insert additional information related to a landmark to a position of the landmark of the original geographical information due to the size or resolution of image data to be inserted, a link to the image data of the landmark or tag information for the image data may be inserted into the position of the landmark in the geographical information.

Therefore, in the moving-path sharing networks 300 and 350, according to embodiments of the present invention, additional information such as an image of a landmark, together with position information, is given to a user who is not familiar with a moving path or a user who does not easily understand a map, thereby allowing the user to easily and conveniently follow path guidance in comparison to a conventional path guidance method using only map information based on a GPS signal.

Figure 13:
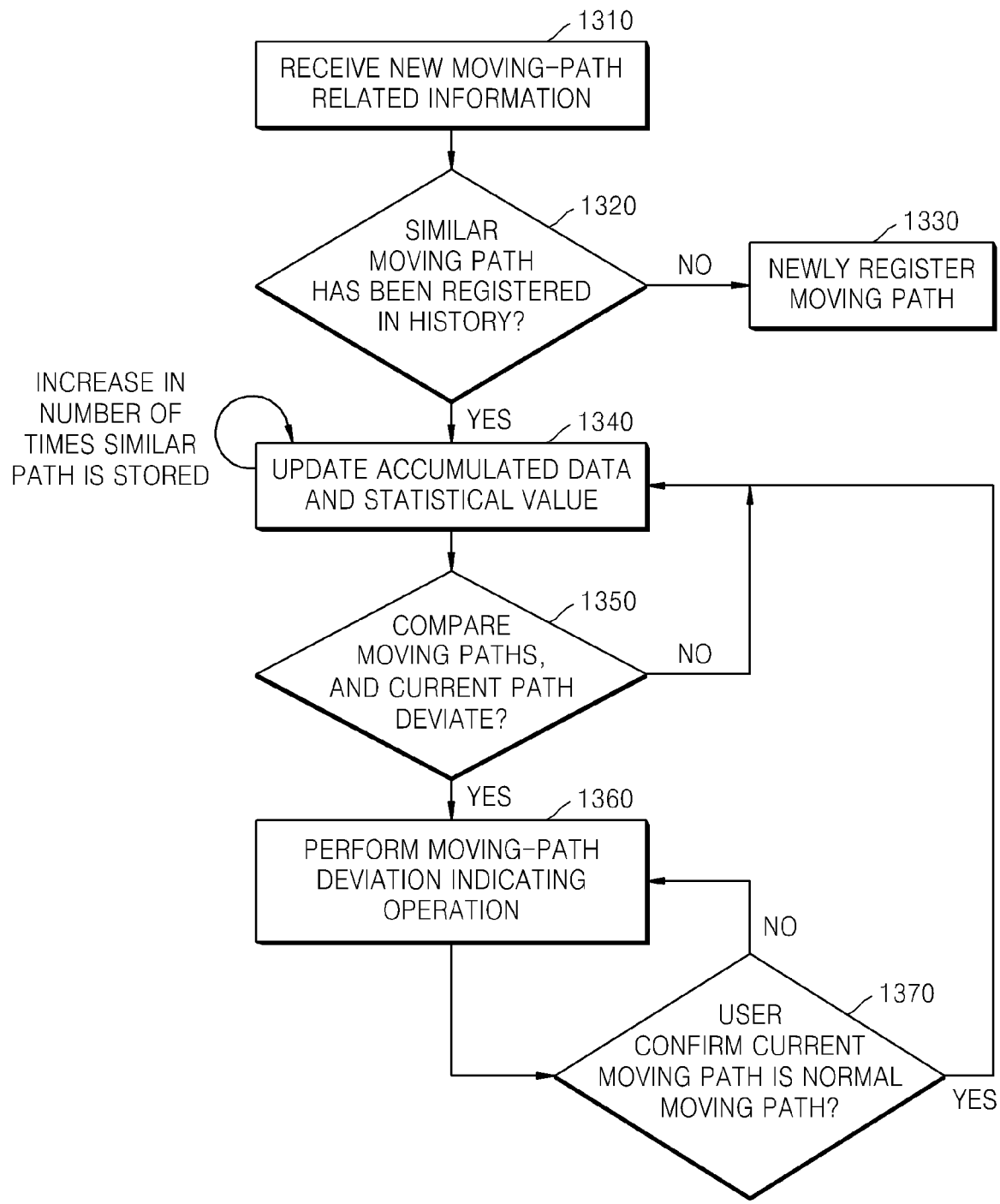
FIG. 13 is a flowchart illustrating a method of comparing and updating paths registered in a moving-path history, according to embodiments of the present invention.

FIG. 13 is a flowchart illustrating a method of comparing and updating paths registered in a moving-path history, according to embodiments of the present invention.

Operations related to a moving-path history described with reference to FIG. 13 may be applied to the first mobile communication device 100 according to the first embodiment and the central server 200 according to the second embodiment.

In step 1310, first moving-path related information is newly generated or received.

In step 1320, it is determined whether a second moving path included in a similar range to a first moving path of the first moving-path related information has been registered among existing moving paths registered in a moving-path history.

If the second moving path similar to the first moving path has not been registered in the moving-path history as a result of the determination of step 1320, the first moving path is newly registered in the moving-path history in step 1330. Statistical data regarding the newly registered first moving path may also be generated.

If the second moving path similar to the first moving path has been registered in the moving-path history as a result of the determination of step 1320, accumulated data of statistical data of the second moving path may be updated based on the first moving path in step 1340. Statistical values may also be updated based on the accumulated data. In this way, as the number of times a new moving path similar to the second moving path is stored increases, the reliability of the statistical data and the statistical values of the second moving path may be improved.

In step 1350, the first moving path and the second moving path may be compared in real time to determine whether the first moving path currently runs along the second moving path. Normal distributions of a path, coordinates, and a speed corresponding to the second moving path may be factors for determination of moving-path deviation. For example, if at least one of a path, coordinates, and a speed corresponding to the first moving path deviate from the normal distributions of the second moving path based on at least one of waypoint information and route information of first moving-path related information, it may be determined that the first moving path currently deviates from the second moving path.

If the first moving path does not deviate from the second moving path as a result of the real-time comparison and determination of step 1350, the process returns to step 1340 to update the statistical data of the second moving path based on the current moving path.

If the first moving path deviates from the second moving path as a result of the real-time comparison and determination of step 1350, a moving-path deviation indicating operation may be performed or moving-path deviation indicating information may be transmitted in step 1360.

In step 1370, upon input of a signal confirming that the first moving path is a normal moving path from a user of the first mobile communication device, accumulated data of statistical data of the second moving path may be updated based on the first moving path.

According to embodiments of the present invention, a determination criterion for determining the degree of similarity between the first moving path and the second moving path in step 1320 and a determination criterion for determining whether the first moving path runs along the second moving path by comparing in real time the first moving path with the second moving path in step 1350, may be set independently of each other. For example, the determination criterion of step 1350 may be stricter than that of step 1320.

All of moving paths of a plurality of mobile communication devices sharing moving-path related information may be registered in a moving-path history. In this case, if it is determined that a current moving path of a mobile communication device is included in a similar range to a moving path of another mobile communication device already registered in the moving-path history, statistical data regarding the moving path of the mobile communication device registered in the moving-path history may be updated.

Figure 14:
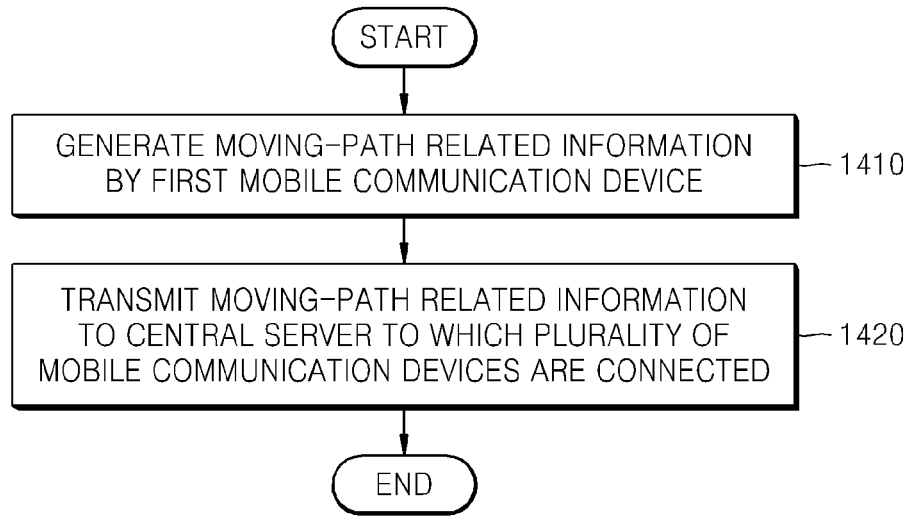
FIG. 14 is a flowchart illustrating a method of generating moving-path related information to share moving paths among a plurality of mobile communication devices, according to the first embodiment of the present invention.

FIG. 14 is a flowchart illustrating a method of generating moving-path related information to share moving paths among a plurality of mobile communication devices, according to the first embodiment of the present invention.

In step 1410, when the plurality of mobile communication devices are connected to the central server, moving-path related information regarding a moving path generated by movement of the first mobile communication device is generated.

Waypoint information and route information included in the moving-path related information may include geographical information such as position information and coordinate information based on a GPS signal. Additional information included in the moving-path related information may include various supplementary data for indicating a particular point in the moving path, such as an administrative address, a common name, and a neighboring principal place in regard to the moving path, reference point information of a public transport, relay station coverage information of the plurality of mobile communication devices, position setting information, traffic conditions, and so forth. The additional information included in the moving-path related information may also include various text data, voice data, image data, and video data, such as image data captured by a camera device of the first mobile communication device in connection with the moving path. The additional information may be generated by user input or downloaded through the web.

In step 1420, the moving-path related information of the first mobile communication device is transmitted to the central server. At the request of the second mobile communication device, the moving-path related information of the first mobile communication device may be transmitted from the central server to the second mobile communication device. Alternatively, the moving-path related information of the first mobile communication device may be transmitted directly to the second mobile communication device.

Figure 15:
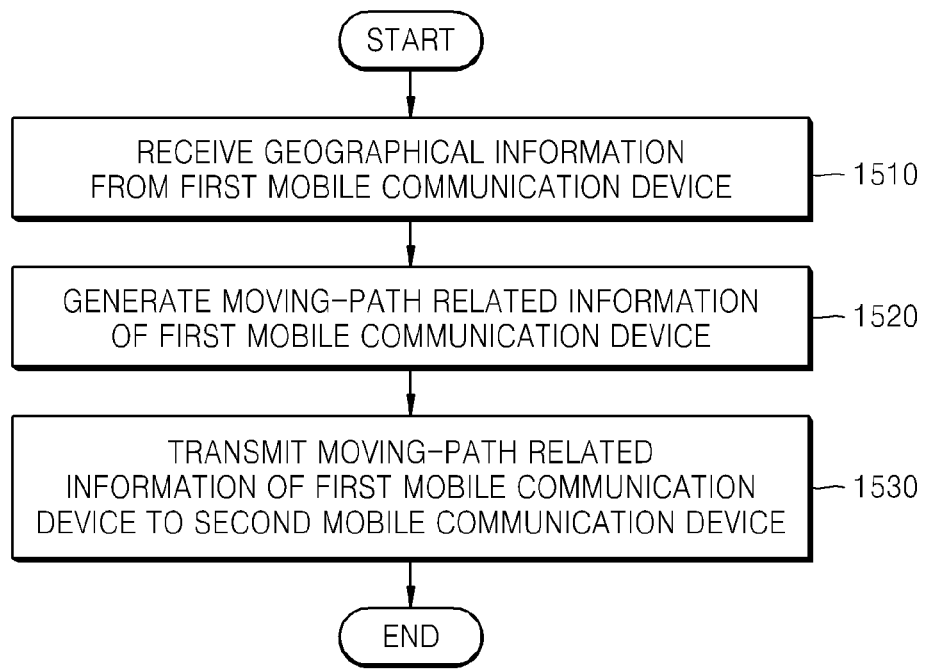
FIG. 15 is a flowchart illustrating a method of managing moving-path related information by a central server to share moving paths among a plurality of mobile communication devices, according to the second embodiment of the present invention.

FIG. 15 is a flowchart illustrating a method of managing moving-path related information by a central server to share moving paths among a plurality of mobile communication devices, according to the second embodiment of the present invention.

To allow a plurality of mobile communication devices of mutually authorized users to share moving-path related information, the plurality of mobile communication devices are authorized and registered as mobile communication devices capable of sharing moving-path related information in the central server.

In step 1510, geographical information related to a moving path generated by movement of the first mobile communication device is received from the first mobile communication device among the plurality of mobile communication devices. The geographical information related to the moving path may include waypoint information and route information. The moving-path related information of the first mobile communication device may be a moving path based on experience of the user of the first mobile communication device.

In step 1520, moving-path related information of the first mobile communication device, which includes received geographical information and additional information related to the moving path of the first mobile communication device, is generated. If the additional information related to the moving path is received from the first mobile communication device, the central server may generate the moving-path related information of the first mobile communication device by using the received waypoint information, route information, and additional information.

If the central server receives a request for generating additional information from the first mobile communication device, the central server may generate the additional information based on the received waypoint information and route information or search the additional information on the web. In this case, the central server may generate moving-path related information of the first mobile communication device, by using the received waypoint information and route information together with the generated additional information.

In step 1530, the moving-path related information of the first mobile communication device is transmitted to a second mobile communication device among the plurality of mobile communication devices. Consequently, through the central server, moving-path related information can be generated, managed, and shared between the first mobile communication device and the second mobile communication device.

Figure 16:
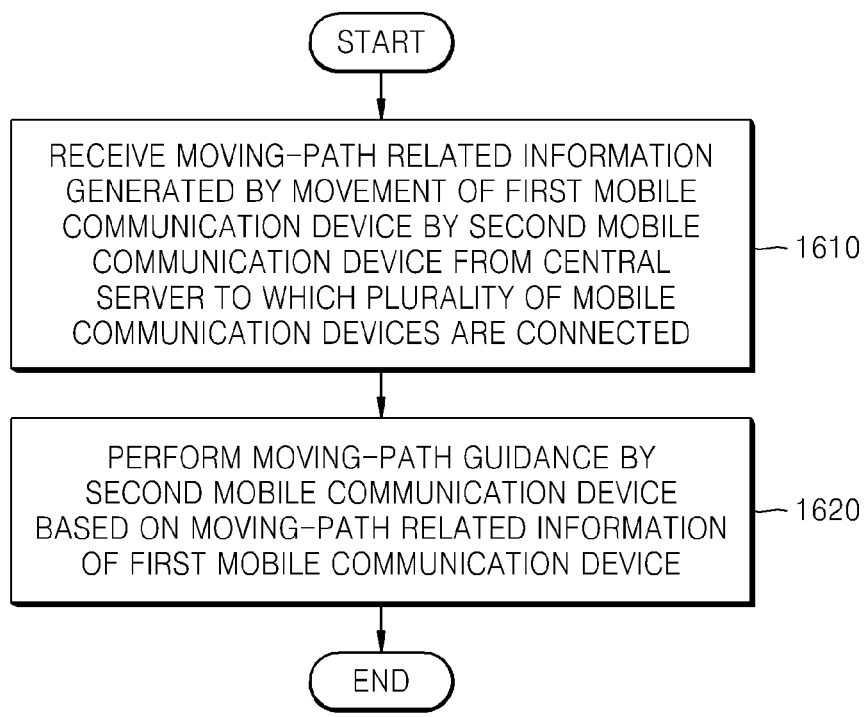
FIG. 16 is a flowchart illustrating a method of being provided with and sharing moving-path related information through sharing of the moving-path related information among a plurality of mobile communication devices, according to embodiments of the present invention.

FIG. 16 is a flowchart illustrating a method of being provided with and sharing moving-path related information through sharing of the moving-path related information among a plurality of mobile communication devices, according to embodiments of the present invention.

In step 1610, a second mobile communication device among a plurality of mobile communication devices receives moving-path related information regarding a moving path generated by movement of a first mobile communication device among the plurality of mobile communication devices from a central server. The moving-path related information stored by the first mobile communication device includes waypoint information, route information, and additional information related to the moving path through which the first mobile communication device passes. The plurality of mobile communication devices including the first mobile communication device and the second mobile communication device are connected to the central server.

The second mobile communication device may request the first mobile communication device, through the central server, or the central server to share a moving-path. At the request of the second mobile communication device, moving-path related information of the first mobile communication device may be transmitted to the second mobile communication device from the first mobile communication device or the central server.

In step 1620, based on the received moving-path related information of the first mobile communication device, moving-path guidance is performed by the second mobile communication device. If the current moving path of the second mobile communication device deviates from the moving path of the first mobile communication device, an alarm sound may be generated.

In a method of sharing moving-path related information according to an embodiment of the present invention, information regarding a moving path based on personal experience, rather than a moving path found by a formula or algorithm for finding a shortest distance, can be shared, thereby providing reliability and practical moving-path related information to persons in similar life or activity areas. However, the first and second embodiments should be considered in a descriptive sense only, and all possible embodiments under the scope of the present invention are not limited thereto.

The foregoing embodiments of the present invention may be implemented as programs that can be executed on computers, and may be implemented on general-purpose digital computers, which operate the programs by using computer-readable recording media. Examples of the computer-readable recording media include magnetic storage media (e.g., Read Only Memory (ROM), floppy disks, hard disks, and so forth) and optical reading media (e.g., CD-ROMs, digital versatile discs (DVDs), and the like).

While the invention has been shown and described with reference to certain embodiments thereof, it will be understood by those of ordinary skill in the art that various changes in form and detail may be made therein without departing from the spirit and scope of the invention as defined by the appended claims. The embodiments should be considered in a descriptive sense only and not for purposes of limitation. Therefore, the scope of the present invention is defined not by the detailed description of the invention but by the appended claims, and all differences within the scope of the present invention will be construed as being included in the present invention.

What is claimed is:

1. A method for sharing information related to a current moving path of a mobile communication device, the method comprising:

receiving, by a server, information related to the current moving path of the mobile communication device among a plurality of devices managed by the server as a single group, wherein the information related to the current moving path comprises geographical information;

receiving, by the server, additional information related to the current moving path from the mobile communication device, wherein the additional information comprises image data comprising images captured by the mobile communication device at corresponding locations along the current moving path;

generating, by the server, collective information based on the information related to the current moving path and the additional information related to the current moving path, wherein, in generating the collective information, the images are inserted at the corresponding locations along the current moving path of the geographical information; and providing, by the server, the collective information to at least one other device of the plurality of devices enabling the at least one other device to display the current moving path of the mobile communication device with the images on a map on a screen of the at least one other device.

2. The method of claim 1, wherein the images are captured by a photographing device of the mobile communication device.

3. The method of claim 1, wherein the server authenticates the mobile communication device and the at least one other device.

4. A method for sharing a current moving path of a mobile communication device, the method comprising:

obtaining, by the mobile communication device, information related to the current moving path of the mobile communication device among a plurality of devices managed by a server as a single group, wherein the information related to the current moving path comprises geographical information;

obtaining, by the mobile communication device, additional information related to the current moving path, wherein the additional information comprises image data comprising images captured by the mobile communication device at corresponding locations along the current moving path;

providing, via the server, collective information based on the information related to the current moving path and the additional information related to the current moving path to at least one other device from among the plurality of devices, wherein the collective information comprises the images inserted at the corresponding locations along the current moving path of the geographical information, wherein the collective information the at least one other device to display the current moving path of the mobile communication device with the images on a map on a screen of the at least one other device.

5. The method of claim 4, wherein obtaining the information comprises:

requesting, from the server, the information related to the current moving path of the mobile communication device; and receiving, from the server, the information related to the current moving path of the mobile communication device.

6. The method of claim 4, wherein providing the collective information comprises:

requesting that the server provide the collective information to the at least one other device.

7. The method of claim 4, wherein the information related to the current moving path of the mobile communication device further comprises at least one of route information of the mobile communication device, or waypoint information of the mobile communication device.

8. The method of claim 7, wherein the at least one of the route information, the waypoint information, or the additional information is generated by the server based on history information of the mobile communication device, and wherein the history information is generated by the server based on a past moving path of the mobile communication device.

9. The method of claim 4, wherein the images are captured by a photographing device of the mobile communication device.

10. A non-transitory computer-readable recording medium having recorded thereon a program for preventing a device from departing from a route, comprising:

a first code segment for generating moving-path related information to be shared among a plurality of mobile communication devices;

a second code segment for generating, by a first mobile communication device among the plurality of mobile communication devices, moving-path related information regarding a current moving path generated by movement of the first mobile communication device, the current moving-path related information comprising geographical information and additional information comprising image data comprising images captured by the first mobile communication device at corresponding locations along the current moving path;

a third code segment for transmitting the moving-path related information of the first mobile communication device to a central server to which the plurality of mobile communication devices are connected, the moving-path related information of the first mobile communication device transmitted to the central server being provided to at least one other mobile communication device of the plurality of mobile communication devices connected to the central server;

a fourth code segment for storing the generated moving-path related information in a database;

a fifth code segment for registering the current moving path of the generated moving-path related information in a moving-path history, registering in the moving-path history comprising, if the first mobile communication device generates first moving-path related information regarding a first moving path, determining whether a second moving path included in a range similar to a first moving path of the first moving-path related information has been registered among existing moving paths registered in the moving-path history;

a sixth code segment for updating accumulated data of statistical data of the second moving path based on the first moving path and statistical values based on the accumulated data, according to whether the second moving path has been registered as a result of the determination;

a seventh code segment for comparing the first moving path with the second moving path in real time to determine whether the first moving path runs along the second moving path; and an eight code segment for performing a moving-path deviation indicating operation indicating moving-path deviation of the first mobile communication device, based on whether the first moving path deviates from the second moving path as a result of the real time determination, wherein, in registering the generated moving-path related information, the at least one of the image data or the video data is inserted at the particular location along the moving path of the geographical information.

11. The non-transitory computer-readable recording medium of claim 10, wherein the moving-path related information comprises at least one of waypoint information, and route information, which are related to the current moving path.

12. The non-transitory computer-readable recording medium of claim 11, wherein the waypoint information related to the current moving path indicates at least one arbitrary geographical point selected from the current moving path.

13. The non-transitory computer-readable recording medium of claim 11, wherein the route information related to the current moving path is defined by at least one of geographical coordinates of consecutive points in a particular interval of the current moving path, a time related to the particular interval, and the particular interval.

14. The non-transitory computer-readable recording medium of claim 10, wherein the additional information related to the current moving path further comprises at least one of text data, voice data, and video data having at least one of an administrative address, a common name, a neighboring principal place in regard to the current moving path of the first mobile communication device, a reference point of a public transport related to the current moving path of the first mobile communication device, a coverage of a relay station of the plurality of mobile communication devices, position description, and information about traffic conditions, and wherein the additional information related to the current moving path is updated by input of a user of the first mobile communication device or data shared through the web.

15. A mobile communication device which generates moving-path information among a plurality of mobile communication devices, the mobile communication device comprising:

at least one processor configured to:

generate moving-path related information regarding a current moving path of a first mobile communication device among the plurality of mobile communication devices, store the moving-path related information in a database and registering the current moving path of the moving-path related information in a moving-path history, and transmit the generated moving-path related information to a central server to which the plurality of mobile communication devices are connected, wherein the moving-path related information transmitted to the central server is provided to at least one other mobile communication device of the plurality of mobile communication devices connected to the central server, wherein registering in the moving-path history comprises:

in response to the first mobile communication device generating first moving-path related information regarding a first moving path, determining whether a second moving path included in a range similar to a first moving path of the first moving-path related information has been registered among existing moving paths registered in the moving-path history, and the moving-path related information storing unit is configured to update accumulated data of statistical data of the second moving path based on the first moving path and statistical values based on the accumulated data, according to whether the second moving path has been registered as a result of the determination;

comparing the first moving path with the second moving path in real time to determine whether the first moving path runs along the second moving path; and performing a moving-path deviation indicating operation indicating moving-path deviation of the first mobile communication device, according to whether the first moving path deviates from the second moving path as a result of the real-time comparison and determination, wherein the moving-path related information comprises geographical information and additional information comprising image data comprising images captured by the mobile communication device at corresponding locations along the current moving path, and wherein, in registering the moving-path, the images are inserted at the corresponding locations along the current moving path of the geographical information.

16. A non-transitory computer-readable recording medium having recorded thereon a program for executing a method of generating moving-path related information to be shared among a plurality of mobile communication devices, wherein the method comprises:

generating, by a first mobile communication device among the plurality of mobile communication devices, moving-path related information regarding a current moving path generated by movement of the first mobile communication device;

transmitting the moving-path related information of the first mobile communication device to a central server to which the plurality of mobile communication devices are connected, the moving-path related information of the first mobile communication device transmitted to the central server being provided to at least one other mobile communication device of the plurality of mobile communication devices connected to the central server;

storing the generated moving-path related information in a database;

registering the moving path of the generated moving-path related information in a moving-path history, registering in the moving-path history comprising, in response to the first mobile communication device generating first moving-path related information regarding a first moving path, determining whether a second moving path included in a similar range to a first moving path of the first moving-path related information has been registered among existing moving paths registered in the moving-path history;

updating accumulated data of statistical data of the second moving path based on the first moving path and statistical values based on the accumulated data, according to whether the second moving path has been registered as a result of the determination;

comparing the first moving path with the second moving path in real time to determine whether the first moving path runs along the second moving path; and performing a moving-path deviation indicating operation indicating moving-path deviation of the first mobile communication device, according to whether the first moving path deviates from the second moving path as a result of the real-time comparison and determination, wherein the moving-path related information comprises geographical information and additional information comprising image data comprising images captured by the mobile communication device at corresponding locations along the moving path, and wherein, in registering the moving-path, the images are inserted at the corresponding locations along the moving path of the geographical information.

* * * * *